Figure 1:
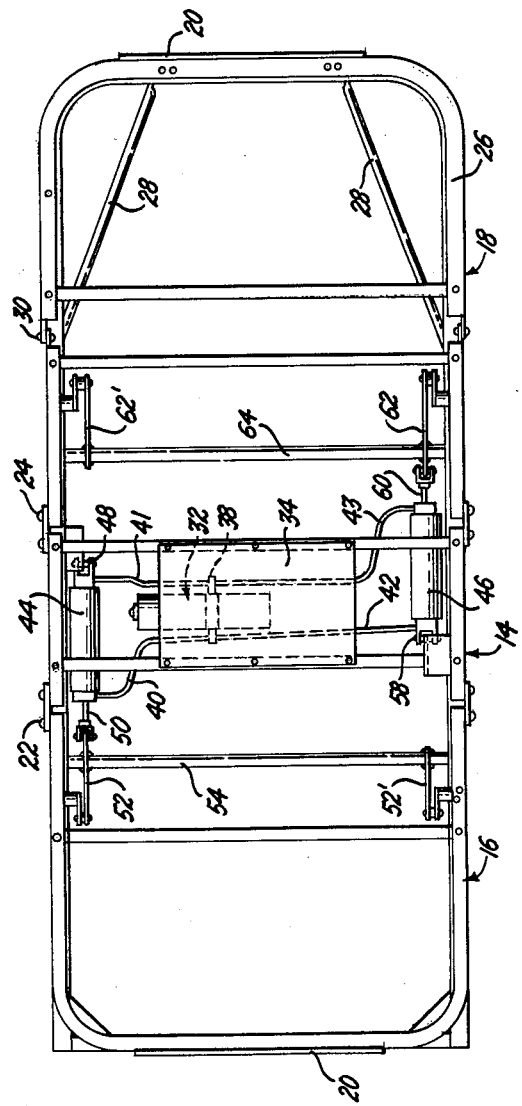

May 1, 1962

S. B. McLEOD 3,032,059

FLUID FLOW CONTROL DEVICE

Filed Sept. 28, 1960

2 Sheets-Sheet 1

INVENTOR.
STEWART B. McLEOD
BY
Dale A. Winnie
ATTORNEY

May 1, 1962

S. B. McLEOD 3,032,059

FLUID FLOW CONTROL DEVICE

Filed Sept. 28, 1960

2 Sheets-Sheet 2

INVENTOR.
STEWART B. McLEOD
BY
Dale A. Winnie
ATTORNEY

United States Patent Office 3,032,059
Patented May 1, 1962

3,032,059
FLUID FLOW CONTROL DEVICE
Stewart B. McLeod, Southfield Township, Oakland County, Mich., assignor to Dura Corporation, Oak Park, Mich., a corporation of Michigan
Filed Sept. 28, 1960, Ser. No. 58,995
3 Claims. (Cl. 137—513.3)

This invention relates to fluid flow control devices in general and more particularly to fluid flow control devices for use with double acting hydraulic power cylinders.

Double acting hydraulic power cylinders are commonly used for such things as operating adjustable contour beds of the type used in hospitals and for invalid care and general use in the home. These contour beds include separate and sometimes operatively interconnected movable head and foot frame sections which are raised and lowered to desired positions by a hydraulic fluid system inclusive of such power cylinders. The double acting power cylinders assure more positive positioning of the actuated bed frame sections, with suitable locking controls, although single stroke cylinders with suitable bleed-down controls are also usable.

In the use of hydraulic power cylinders for elevating and lowering the frame sections of adjustable contour hospital beds, and like uses elsewhere, it will be appreciated that the fluid pressure system is first opposed by the weight of the movable member, and anything carried thereon, and is subsequently assisted thereby. Accordingly, and without suitable or distinctly separate controls, it is expected that the ascent of such movable members will be slower than their controlled descent. This is particularly bothersome with adjustable contour bed installations, where a relatively fast descent of the head frame section would be most noticeable by one carried thereon and, at the same time, an appreciably slower ascending movement for the resultant slower descent or expensive counteracting controls are undesirable.

It is an object of this invention to provide a control device for use with hydraulic power cylinders, and like power actuators, that may be incorporated therein and will reasonably counteract the gravitational effects of members required to be raised and lowered thereby.

It is also an object of this invention to teach an extremely simple and inexpensive expedient which may be readily incorporated within presently installed or new power cylinders to obtain the desired result.

It is another object of this invention to disclose a control device for the purposes aforesaid which is comprised of but two parts requiring only simple machining operations to form and is essentially only one part with the simple adaptation of existing parts for the accommodation thereof.

It is a further object of this invention to teach the use of a self-sufficient and automatically responsive control device which is entirely mechanical in nature and is essentially troublefree.

In more specific detail, it is an object of this invention to teach the use of a control device within the fluid passage of a power cylinder which includes a fluid pressure responsive check valve cooperatively formed and disposed to afford alternate flow passages for the predetermined restriction of fluid flow therethrough and consequent control of the power stroke rate of the power cylinder member.

These and other objects and advantages of this invention will be more apparent upon a reading of the following specification and a study of the accompanying drawings in regard to an operative mechanism making use of such invention.

Figure 2:
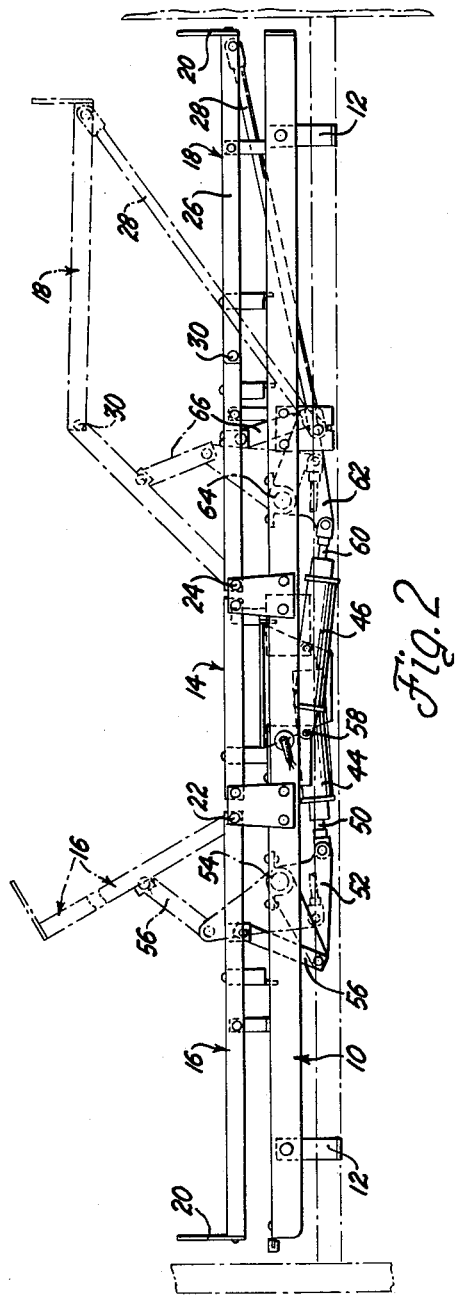
Figure 3:
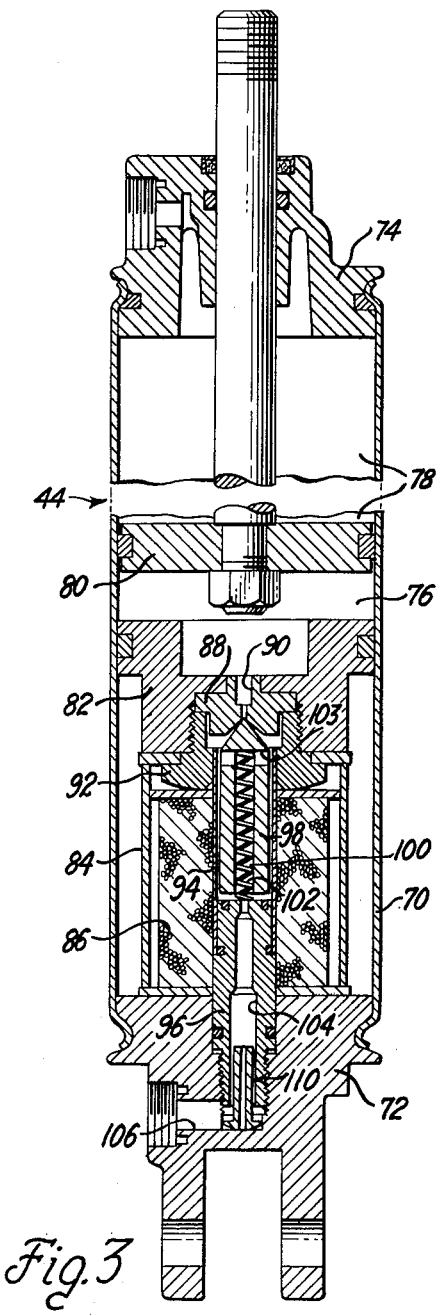
Figure 4:
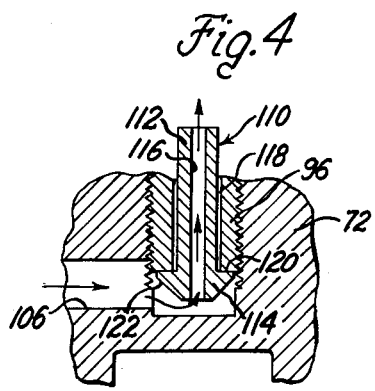
Figure 5:
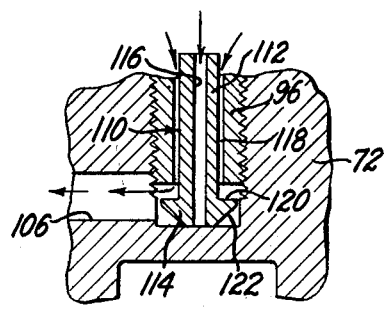

In the drawings:
FIGURE 1 is a plan view of a power operated contour bed structure including this invention.
FIGURE 2 is a side view of the bed structure shown in FIGURE 1.
FIGURE 3 is an enlarged and cross sectional view of one of the power operating cylinders for the bed structure shown by FIGURES 1 and 2.
FIGURE 4 is an enlarged detailed view of the control device of this invention as disposed for the control of hydraulic fluid flow therethrough in one direction.
FIGURE 5 is similar to FIGURE 4 with the control element shown as disposed for the flow of hydraulic fluid therethrough in the opposite direction.

FIGURES 1 and 2 show a power operated contour bed which includes a main frame or bedstead 10 having legs 12 provided near each corner thereof. The legs 12 serve as supports if the bed is used without conventional head and foot boards.

A bridging mid-frame section 14 is secured to the main frame 10 and head and foot frame sections 16 and 18, respectively, are pivotally connected thereto. The main frame 10, mid-section frame 14, head frame section 16 and foot frame section 18 are preferably of angle iron stock suitably reinforced for their intended purpose.

Mattress guards 20 are fastened to the head and foot sections to prevent displacement of the mattress (not shown) during operation of the bed.

The head frame section 16 is pivotally connected to the mid-frame section 14, as at 22, and is operable between horizontally and vertically disposed positions, as shown by solid and phantom outline in FIGURE 2, by a hydraulically actuated control linkage which will be subsequently described.

The foot frame section 18 is similarly movable about the axis of its pivotal connection 24 to the mid-frame section 14.

The foot frame section 18 will be noted to include an articulated end section 26 which is engaged to the main frame 10 by radius arms 28. Such connection causes the foot frame section 18 to "break" at the axis of the intermediate pivotal connection 30 in the course of elevating the foot frame section and maintains the end foot section 26 in a near-horizontal position throughout its range of movement to afford a more comfortable rest position for the lower limbs of the person reclining on the bed.

The power unit for operating the movable head and foot frame sections 16 and 18 comprises a reversible electric motor, reservoir and pump mounted in end-to-end relationship as a unitary assembly 32. The power assembly 32 is supported on the underside of a plate member 34 which forms part of the mid-frame section 14 and is operatively connected by suitable fittings 36 and 38 and flexible fluid flow conduits 40—43 to separate power cylinders 44 and 46 provided on opposite sides of the main frame 10. The power cylinders 44 and 46 are operatively and respectively engaged to the head and foot frame sections 16 and 18. The flow conduits 40 and 41 are connected to opposite ends of the power cylinder 44, and the flow conduits 42 and 43 to the opposite ends of the power cylinder 46, to afford double acting fluid pressure control thereof.

It will be appreciated that although separate power cylinders 44 and 46 are illustrated for use in separately actuating the head and foot frame sections 16 and 18, that one power cylinder and suitable interconnecting slave linkage might be used in a more simplified construction.

The head section power operating cylinder 44 is pivotally connected to the main frame as at 48 and has the piston rod 50 thereof engaged to a bell crank lever 52 fulcrumed on a pivotal axis 54 provided on the main frame 10. Such lever arm 52, together with a similar bell crank lever 52' fulcrumed on the other end of the pivotal axis 54, is engaged to operating links 56 provided on the head frame section 16.

The foot section operating power cylinder 46 is similarly pivotally connected to the mid-frame 10, as at 58, and has the piston rod 60 thereof engaged to a bell crank lever 62 fulcrumed on a pivotal axis 64 provided on the main frame 10 under the foot frame section 18. The lever 62 and a like lever 62', similarly fulcrumed on a pivotal axis 64 near the other side of the main frame 10 are engaged to operating links 66 engaged to the midframe engaging section of the foot frame section 18.

Referring now to FIGURE 3;

The hydraulic cylinders 44 and 46, as adapted to include the control device of the present invention, are essentially identical in construction. Accordingly, only the power cylinder 44 will be described in detail.

It will also be appreciated that the control device of the present invention, as included in only one of the power cylinders 44 and 46, is more advantageously included within the head frame operating control system of cylinder 44 where the gravitational effect is greater, due to the relatively longer trunk supporting length of the head frame section, and where variants in the ascending and descending rate of the head section is more apparent to a bed patient.

The power cylinder 44 is shown to include a cylindrical body member 70 closed at each end by die-cast end members 72 and 74. Hydraulic fluid from the power unit 32 flows into and out of the cylinder through the chambers 76 and 78 to move the piston head 80 in accordance with the direction of pressure flow.

A solenoid operated valve is provided within the frame connected end of the cylinder for controlling the flow of fluid under pressure to and from the chamber area 76 on the head side of the piston 80. A stop member 82 is positioned within the cylinder for engagement by the piston 80 at the lower end of the piston stroke and is spaced from the end of the cylinder by a sleeve 84 which encloses the solenoid coil 86. The bottoming stop 82 also carries a valve seat member 88 which is provided with a passageway 90 in communication with chamber 76. It is also adapted to receive a threaded fitting 92 having a tube portion 94 welded thereto and extending centrally through the solenoid coil 86. An end fitting 96 is secured to the end of the tube 94 and is received in threaded engagement with the die-cast end 72 of the cylinder.

A plunger 98 is disposed within the tube portion 94 and has the conical end thereof disposed for closing the passageway 90 that extends through the valve seat 88. The plunger 98 is provided with a fluid receptive passage 100 which also houses a compression spring 102 that bears against the end fitting 96 and holds the plunger against the valve seat 88 except when the solenoid coil 86 is energized.

When the plunger 98 is retracted, during energization of the solenoid coil 86, fluid flow is permitted to and from chamber 76 via passage 90, ports 103 provided in the plunger and communicating with the plunger passage 100, aligned passages 100 and 104 (through end fitting 96), and the die-cast fitting passage 106.

The plunger 98 in precluding fluid flow thereby prevents creeping of the piston 80 and enables positive positioning of the cylinder operated bed sections. The compression spring 102 is chosen of sufficient strength to resist creeping of the piston 80 under ordinary pressure loads but is intended to yield under extra-ordinary pressure conditions which might otherwise burst the cylinder, hoses and other fittings in the closed fluid system arrangement.

The control device of this invention is shown as disposed within the area of the intersecting passages 104 and 106. It includes a fluid pressure responsive check valve member 110 having a stem portion 112 guided within passage 104 and a head portion 114 disposed beyond the end of the passage 104. A passage 116 is formed axially through the valve stem and head portions and serves as one of two alternate fluid flow passages which will be subsequently described.

The valve stem 112 is formed to include a relatively smaller outer diameter than the passage 104 to afford freedom of axial movement therefor and to provide a clearance space 118 which serves as an annular flow passage.

The valve head 114 is formed to include a shoulder 120 which seats against the end of fitting 96 to close the clearance space passage 118. It also has an end face 122 which is conical or semispherical to afford a pressure responsive area sufficient to raise the valve to such seated position.

The side wall of passage 106 is formed to receive the valve head 114 in engagement therewith and to close the flow passage 116 when so engaged.

When fluid is permitted to flow into chamber area 76, to advance the piston 80, the valve member 110 will be lifted to the position shown by FIGURE 4. The area of the end face 122 is relatively larger than the area of the shoulder 120, and accordingly, the valve will be seated to close the annular clearance passage 118 and open the alternate passage 116 to fluid flow centrally through the flow restrictive check valve member.

In the course of the return stroke of the piston 80, when fluid is forced from the chamber area 76, the responsive valve member 110 assumes the position shown by FIGURE 5. The greater pressure on the end of the valve stem 112, and on the shoulder 122 via the clearance space 118, causes the valve head to seat against the side wall of passage 106 and close the central passage 116.

It will be appreciated that the respective areas of the central and clearance passages 116 and 118 may be sized to afford a greater fluid flow in one direction, and accordingly a faster advance or return stroke of the piston member 80, under otherwise equal fluid pressure conditions. Conversely, with unequal external conditions, such as due to gravitational effects, the respective areas may be sized to counterbalance such extraneous factors and assure a reasonably similar rate of piston advance and retraction.

In the illustrated embodiment, it will be appreciated that the power cylinders 44 and 46 are required to raise their respective frame sections 14 and 16 against the adverse pressure resulting from the weight of such frame sections and whatever is carried thereon. However, their return stroke is assisted by such induced pressure condition and, as mentioned, most frequently to an undesirable extent.

To counteract the adverse pressure condition of the return stroke, the annular clearance space 118 is undersized relative to the passage 116. Accordingly, the annular passageway serves as a simple leak-down control during the return stroke of piston 80 and assures reasonable equivalence of the rate of raising and lowering the power cylinder operated frame members.

It will be appreciated that fluid flow through the respective restriction passages 116 and 118 is uni-directional and accordingly less subject to fouling by any impurities entrapped in the hydraulic fluid. Further, the smaller of the restriction passages, 118, is provided with relatively movable parts which serves to guard against obstruction. A still further safeguard against valve lock-up is the alternate seating of the valve head 114 which serves to break-up and shake loose any fluid contaminant.

While a preferred form of the present invention has been described and illustrated it is obvious that certain variations and modifications are within the spirit and scope of the inventive concept presented. Accordingly, such variations and modifications of this type which are not specifically excluded by the language of the hereafter appended claims shall be considered as encompassed within such claims.

I claim:
1. A fluid flow control device, comprising; a housing having a fluid flow passageway provided therethrough, a valve seat provided in said passageway, a fluid flow pressure responsive valve member including a valve stem guided in said passageway and a valve head engageable with said valve seat, a by-pass passage formed through said valve stem and head and in open communication with said passageway when said valve head and seat are engaged, and a passageway wall disposed to close said by-pass passage when said valve head and seat are disengaged, and the fluid flow openings through said valve seat and by-pass passage being of relatively different size for greater fluid flow through one thereof.

2. In a fluid flow control device, a housing having an axially disposed fluid passage therein; a tubular check valve member disposed in said passage for limited movement therein and having clearance between the outer portion thereof and the wall of said passage, said member having an enlarged head portion and a fluid passage constructed and arranged such that said last-named passage is closed when said member is in one position of movement and open when said member is in its other position of movement; and said first-named passage is open when said member is in said one position of movement and closed when said member is in its said other position of movement; said head portion having a shoulder adapted to seat against a portion of said housing to close said first-named passage and an end face adapted to seat against another portion of said housing to close said last-named passage.

3. The combination set forth in claim 2 wherein said valve member head portion is of tapered shape thereby to provide a differential pressure area with respect to the area of said shoulder.

References Cited in the file of this patent
UNITED STATES PATENTS

| | | |
|---|---|---|
| 577,489 | Mills | Feb. 23, 1897 |
| 2,061,830 | Campbell | Nov. 24, 1936 |
| 2,323,731 | Shetzline | July 6, 1943 |
| 2,633,860 | Derrington | Apr. 7, 1953 |
| 2,932,045 | Rabelow | Apr. 12, 1960 |

FOREIGN PATENTS

| | | |
|---|---|---|
| 493,306 | Canada | June 2, 1953 |